United States Patent [19]

Smith

[11] Patent Number: 5,734,501

[45] Date of Patent: Mar. 31, 1998

[54] HIGHLY CANTED RETROREFLECTIVE CUBE CORNER ARTICLE

[75] Inventor: Kenneth L. Smith, White Bear Lake, Minn.

[73] Assignee: Minnesota Mining and Manufacturing Company, St. Paul, Minn.

[21] Appl. No.: 742,840

[22] Filed: Nov. 1, 1996

[51] Int. Cl.$^6$ .................................................. G02B 5/124
[52] U.S. Cl. ............................................ 359/530; 359/529
[58] Field of Search ........................... 359/529, 530; 264/1.1, 1.9; 428/156, 221, 323

[56] References Cited

U.S. PATENT DOCUMENTS

| | | |
|---|---|---|
| 835,648 | 11/1906 | Straubel . |
| 1,591,572 | 7/1926 | Stimson . |
| 2,027,441 | 1/1936 | Landis .................................. 41/34 |
| 2,310,790 | 2/1943 | Jungersen . |
| 2,380,447 | 7/1945 | Jungersen . |

(List continued on next page.)

FOREIGN PATENT DOCUMENTS

| | | | |
|---|---|---|---|
| 0 269 329 A2 | 6/1988 | European Pat. Off. | ........ G02B 5/122 |
| 9217179.6 | 4/1993 | Germany | ............ G02B 5/124 |
| 42 36 799 A1 | 5/1994 | Germany | ............ G02B 5/124 |
| 423464 | 2/1935 | United Kingdom . | |
| 441319 | 1/1936 | United Kingdom . | |

OTHER PUBLICATIONS

Eckhardt, "Simple Model of Corner Reflector Phenomena", Applied Optics, vol. 10, No. 7, pp. 1559–1566 (Jul. 1971).

Hecht, "The Electromagnetic Approach", Optics, 2nd Ed., pp. 99–108, 1987.

*Primary Examiner*—James Phan
*Attorney, Agent, or Firm*—Jed W. Caven; Robert H. Jordan; Stephen C. Jensen

[57] ABSTRACT

A retroreflective article that exhibits high retroreflective efficiency in response to light incident on the sheeting at high angles of incidence is disclosed. A retroreflective article includes a body portion having a base surface and a structured surface opposite the base surface. The structured surface includes a plurality of retroreflective cube corner elements defined by two intersecting groove sets. Each cube corner element has three tetragonal optically reflective faces that intersect to define a cube corner apex and two tetragonal non-optical faces that intersect along an edge. The symmetry axes of the cube corner elements are substantially parallel.

20 Claims, 5 Drawing Sheets

U.S. PATENT DOCUMENTS

| | | |
|---|---|---|
| 2,407,680 | 9/1946 | Palmquist et al. . |
| 3,190,178 | 6/1965 | McKenzie . |
| 3,417,959 | 12/1968 | Schultz . |
| 3,684,348 | 8/1972 | Rowland . |
| 3,689,346 | 9/1972 | Rowland . |
| 3,712,706 | 1/1973 | Stamm . |
| 3,810,804 | 5/1974 | Rowland ................ 156/245 |
| 3,811,983 | 5/1974 | Rowland ................ 156/245 |
| 3,812,706 | 5/1974 | Higges et al. ............. 73/59 |
| 3,873,184 | 3/1975 | Heenan . |
| 3,922,065 | 11/1975 | Schultz . |
| 3,924,928 | 12/1975 | Trimble . |
| 3,924,929 | 12/1975 | Holmen et al. . |
| 3,926,402 | 12/1975 | Heenan ................... 249/117 |
| 4,025,159 | 5/1977 | McGrath . |
| 4,066,236 | 1/1978 | Lindner ................... 249/160 |
| 4,066,331 | 1/1978 | Lindner . |
| 4,149,304 | 4/1979 | Brynjegard ............ 29/148.4 D |
| 4,202,600 | 5/1980 | Burke et al. . |
| 4,208,090 | 6/1980 | Heenan . |
| 4,243,618 | 1/1981 | Van Arnam ................. 264/1 |
| 4,332,437 | 6/1982 | Searight et al. ........... 359/531 |
| 4,349,598 | 9/1982 | White ................... 428/161 |
| 4,478,769 | 10/1984 | Pricone et al. ............ 264/1.6 |
| 4,498,733 | 2/1985 | Flanagan . |
| 4,576,850 | 3/1986 | Martens ................. 428/156 |
| 4,582,885 | 4/1986 | Barber .................... 528/28 |
| 4,588,258 | 5/1986 | Hoopman . |
| 4,618,518 | 10/1986 | Pricone et al. ............. 428/40 |
| 4,668,558 | 5/1987 | Barber .................. 428/156 |
| 4,703,999 | 11/1987 | Benson .................. 359/529 |
| 4,712,867 | 12/1987 | Malek . |
| 4,726,706 | 2/1988 | Attar ..................... 404/14 |
| 4,775,219 | 10/1988 | Appeldorn et al. . |
| 4,801,193 | 1/1989 | Martin . |
| 4,895,428 | 1/1990 | Nelson et al. . |
| 4,938,563 | 7/1990 | Nelson et al. . |
| 4,952,023 | 8/1990 | Bradshaw et al. ......... 359/529 |
| 5,122,902 | 6/1992 | Benson .................. 359/529 |
| 5,138,488 | 8/1992 | Szczech ................. 359/529 |
| 5,156,863 | 10/1992 | Pricone et al. ........... 425/363 |
| 5,171,624 | 12/1992 | Walter .................. 428/156 |
| 5,175,030 | 12/1992 | Lu et al. ................. 428/30 |
| 5,183,597 | 2/1993 | Lu ....................... 264/1.4 |
| 5,237,449 | 8/1993 | Nelson et al. ........... 359/532 |
| 5,272,562 | 12/1993 | Coderre ................ 359/529 |
| 5,450,235 | 9/1995 | Smith et al. ............ 359/529 |
| 5,491,586 | 2/1996 | Phillips ................ 359/530 |
| 5,565,151 | 10/1996 | Nilsen ................... 264/1.1 |

HIGHLY CANTED RETROREFLECTIVE CUBE CORNER ARTICLE

FIELD OF THE INVENTION

The present invention relates to cube corner type retroreflective articles. In particular, the present invention relates to retroreflective cube-corner sheeting adapted to retroreflect light incident on the sheeting at relatively high angles of incidence.

BACKGROUND

Retroreflective materials have the property of redirecting light incident on the material back towards its originating source. This advantageous property has led to the widespread use of retroreflective sheetings on a variety of articles. Very often the retroreflective sheetings are used on flat inflexible articles, for example, road signs and barricades; however, situations frequently arise which require the sheetings to be used on irregular or flexible surfaces. For example, a retroreflective sheeting may be adhered to the side of a track trailer, which requires the sheeting to pass over corrugations and protruding rivets, or the sheeting may be adhered to a flexible body portion such as a road worker's safety vest or other such safety garment. In situations where the underlying surface is irregular or flexible, the retroreflective sheeting desirably possesses the ability to conform to the underlying surface without sacrificing retroreflective performance.

There are two common types of retroreflective sheeting: microsphere-based sheeting and cube corner sheeting. Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. Illustrative examples of such retroreflectors are disclosed in U.S. Pat. Nos. 3,190,178 (McKenzie), 4,025,159 (McGrath), and 5,066,098 (Kult).

Basic cube corner retroreflective sheeting is well-known to those of ordinary skill in the retroreflective arts. The sheeting comprises a body portion having a substantially planar base surface and a structured surface comprising a plurality of cube corner elements opposite the base surface. Each cube-corner element comprises three mutually substantially perpendicular optical faces that intersect at a single reference point, or apex. The bottom edges of the optical faces define the base of the cube corner element, which acts as an aperture through which light is transmitted into the cube corner element. In use, light incident on the base surface of the sheeting is refracted at the base surface of the sheeting, transmitted through the bases of the cube corner elements disposed on the sheeting, reflected from each of the of the three perpendicular cube-corner optical faces, and redirected toward the light source. The symmetry axis, also called the optical axis, of a cube corner element is the axis that extends through the cube corner apex and forms an equal angle with the three optical surfaces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

Cube corner retroreflective sheeting may be designed to exhibit its peak performance in response to light incident on the base surface of the sheeting at a specific angle of incidence. The term 'entrance angle' is used to denote the angle of incidence, measured from an axis normal to the base surface of the sheeting (e.g. a normal vector to the base surface), of light incident on the sheeting. See, e.g. ASTM Designation: E 808-93b, Standard Practice for Describing Retroreflection. Retroreflective sheeting for signing applications is typically designed to exhibit its optimal optical efficiency at relatively low entrance angles (e.g. approximately normal to the base surface of the sheeting). See, e.g. U.S. Pat. No. 4,588,258 to Hoopman. Other applications such as, for example, pavement marking or barrier marking applications, require retroreflective sheeting designed to exhibit its maximum optical efficiency at relatively high entrance angles. For example, U.S. Pat. No. 4,349,598 to White ('598 patent) discloses a retroreflective sheeting design wherein the cube corner elements comprise two mutually perpendicular rectangular faces disposed at 45 degrees to the cube corner sheeting base and two parallel triangular faces perpendicular to the rectangular faces to form two optically opposing cube corner elements. U.S. Pat. No. 4,895,428 to Nelson, et al. ('428 patent) and U.S. Pat. No. 4,938,563 to Nelson et al. ('563 patent), disclose a retroreflective sheeting wherein the cube corner elements comprise two nearly perpendicular tetragonal faces and a triangular face nearly perpendicular to the tetragonal faces to form a cube corner. The cube corner elements further include a non-perpendicular triangular face.

The 'highest' point of the cube corner elements described in either the '598 patent, the '428 patent or the '563 patent is an edge defined by the intersection of two cube corner element faces. When retroreflective sheeting in accordance with these patents is brought into contact with a medium such as, for example, a sealing film, the optical performance of the sheeting may be degraded at the interface between the cube corner elements and the seal film, particularly if the cube corner elements are not coated with a specularly reflective substance. Additionally, the load-bearing characteristics of sheeting in accordance with these patents may be limited. Mechanical stresses between the cube corner sheeting and an adjacent medium are concentrated across the line of physical contact between the cube corner elements and the adjacent medium, resulting in areas of relatively high pressure. High pressure can distort the physical characteristics of the cube corner elements, thereby distorting the optical characteristics of the sheeting.

SUMMARY OF THE INVENTION

The present invention provides a cube corner article that, in one embodiment, is adapted to retroreflect light incident on the article at relatively high incidence angles. A retroreflective article in accordance with the present invention comprises a body portion having a base surface and a structured surface opposite the base surface. The structured surface includes an array of cube corner elements defined by two intersecting groove sets. At least one, and preferably a plurality, of the cube corner elements in the array includes a first tetragonal optical face, a second tetragonal optical face that intersects the first optical face at an orthogonal dihedral angle, and a third tetragonal optical face that intersects the first and second optical faces at orthogonal dihedral angles to define a cube corner element having an apex defined by the point of mutual intersection of the three faces. Additionally, at least one, and preferably a plurality, of cube corner elements includes a first tetragonal non-optical face disposed at a non-zero relief angle relative to a plane normal vector to the base plane and a second tetragonal non-optical face disposed at a non-zero relief angle relative to a normal vector to the base plane that intersects the first non-optical face.

According to one embodiment of the invention, the first and second optical faces of the cube corner elements are disposed in planes that are substantially parallel with a normal vector to the base surface of the body portion and the third optical face is substantially parallel to the base surface of the body portion. In alternate embodiments the first and second optical faces of the cube corner elements are disposed at non-zero relief angles that preferably measure less than about 20 degrees, and more preferably measure less than about 10 degrees, relative to a normal vector to the base surface of the body portion. Accordingly, the third optical face is disposed in a plane that intersects the base surface of the sheeting at an oblique angle that preferably measures less than about 30 degrees, and more preferably measures less than 20 degrees.

The symmetry axes of cube corner elements in accordance with one embodiment of the present invention intersect the base plane of the body portion at an angle of approximately 35°. Accordingly, a retroreflective sheeting in accordance with the present invention is particularly well adapted to retroreflect light incident on the base surface of the sheeting at relatively high angles of incidence. Additionally, the symmetry axes of an array of cube corner elements in accordance with the present invention are substantially parallel. Thus, the optical response pattern of the retroreflective article is asymmetrical in nature.

These figures, which are idealized, are not to scale and are intended to be merely illustrative and non-limiting.

DETAILED DESCRIPTION

In the following detailed description of illustrative embodiments, reference is made to the accompanying drawings which form a part hereof, and in which is shown by way of illustration specific embodiments of the invention. It is to be understood that other embodiments may be utilized and structural changes may be made without departing from the scope of the present invention.

According to one embodiment, the present invention provides cube corner retroreflective sheeting having cube corner elements particularly adapted to retroreflect light incident on the sheeting at relatively high entrance angles. Sheeting in accordance with the present invention may be manufactured from molds comprising the negative image of cube corner arrays. Such molds and exemplary methods for making them are disclosed in further detail in co-pending and commonly assigned patent application entitled "CUBE CORNER ARTICLE MASTER MOLD AND METHOD OF MAKING THE SAME", filed concurrently with the present application, which is incorporated herein by reference.

FIGS. 1–4 disclose a representative example of a retroreflective article in accordance with aspects of the present invention. Referring to FIGS. 1–4, a retroreflective article in accordance with the present invention preferably comprises retroreflective sheeting 8. Retroreflective sheeting 8 preferably includes a body portion 10 having a base surface 12 and a structured surface 14 opposite base surface 12. Retroreflective sheeting 8 may be of integral (e.g. unitary) construction, wherein body portion 10 and structured surface 14 are integrally formed using a suitable molding or embossing process. Alternatively, retroreflective sheeting 10 may be of a composite construction wherein body portion 10 and structured surface 14 are formed separately and laminated or otherwise adhered together.

Figure 1:
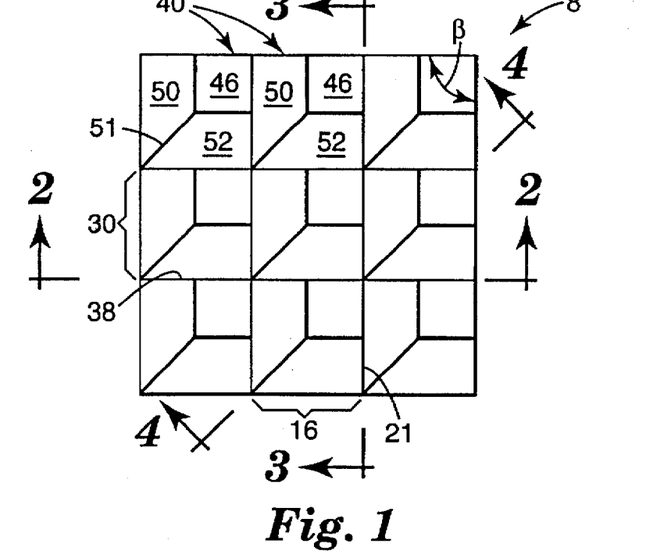
FIG. 1 is a plan view of the structured surface of one embodiment of a cube corner article in accordance with the present invention.
Figure 2:
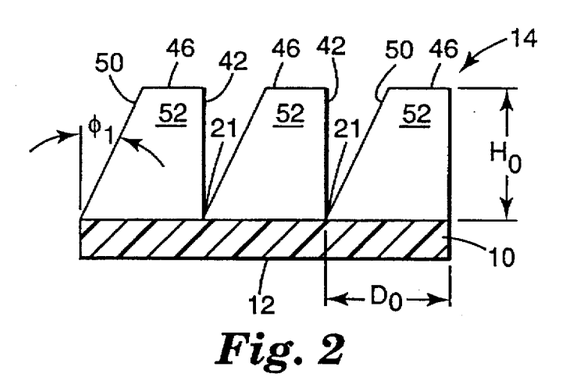
FIG. 2 is a section view, taken through plane 2—2, of the cube corner article depicted in FIG. 1.

In a preferred embodiment, structured surface 14 comprises an array of cube corner elements 40 defined by a first groove set 16 and a second groove set 30. As used herein, the term 'groove set' shall refer to all parallel grooves on structured surface 14 of body portion 10. First groove set 16 includes at least two, and preferably a plurality of parallel grooves. Adjacent grooves in first groove set 16 are separated by a distance $D_0$. In theory, there is no upper limit to the distance $D_0$, however, in practice the upper limit of the distance $D_0$ is related to the thickness of the sheeting material. Present precision machining techniques enable the manufacture of grooves separated by a distance $D_0$ as small as 0.010 millimeters. A preferred range for the separation distance $D_0$ extends between 0.026 millimeters and 0.260 millimeters. This distance accommodates a flexible retroreflective sheeting product within conventional machining tolerances. Referring to FIG. 2, it can be seen that each groove in first groove set 16 defines a plurality of optical surfaces 42 and a plurality of non-optical surfaces 50 that intersect at first groove base 21. Further, groove base 21 is preferably disposed at a depth $H_0$ approximately equal to the distance $D_0$ between adjacent grooves in groove set 16. In the embodiment depicted in FIGS. 1–4, optical surfaces 42 are disposed in a plane that is substantially parallel with a normal vector to base surface 12 of body portion 10. By contrast, non-optical surfaces 50 are disposed in a plane that forms an oblique angle $\phi_1$ with a normal vector to base surface 12 of body portion 10.

As used herein, the term "optical surface" shall refer to a surface which forms one of the three reflective, or optical, faces of a cube corner dement. As previously discussed, a cube corner element is defined by the intersection of three substantially mutually perpendicular optical surfaces (e.g. faces) that mutually intersect at a common point (e.g. the cube corner apex). Optical surfaces should be substantially optically smooth, which, for the purposes of this disclosure, shall mean that an optical surface reflects light incident on the surface with minimal scattering or diffusion. As used herein, the term "non-optical surface" shall refer to a surface which does not form a reflective face of a cube corner element. Many cube corner element array designs do not utilize non-optical surfaces (See e.g. U.S. Pat. No. 4,588,258). However, non-optical surfaces are a necessary element of some cube corner array designs adapted to retroreflect high entrance angle light. (See e.g. U.S. Pat. No. 4,895,428). Non-optical surfaces need not be optically smooth.

Figure 3:
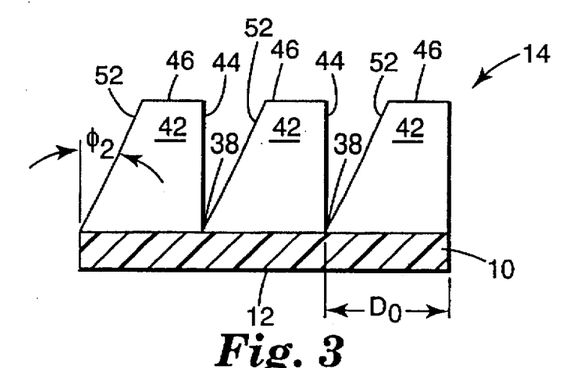
FIG. 3 is a section view, taken through plane 3—3, of the cube corner article depicted in FIG. 1.

Referring to FIG. 3, it can be seen that each groove in second groove set 30 also defines a plurality of optical surfaces 44 and a plurality of non-optical surfaces 52 that intersect at second groove base 38. Preferably, the base 38 of each groove in the second groove set 30 is disposed at the same depth (Ho) as the base 21 of each groove in first groove set 16, however it will be appreciated that groove base 38 may be disposed at a different depth than groove base 21. Adjacent grooves in second groove set 30 are also preferably separated by a distance $D_0$ between 0.026 millimeters and 0.260 millimeters. In the embodiment depicted in FIGS. 1–4, optical surfaces 44 are disposed in a plane that is substantially perpendicular to base surface 12 of body portion 10. By contrast, non-optical surfaces 52 are disposed in a plane that forms an oblique angle $\phi_2$ with a normal vector to base surface 12 of body portion 10.

A plurality of grooves in first groove set 16 intersect a plurality of grooves in second groove set 30 at an intersection angle $\beta$ (FIG. 1) to define an array of cube corner elements 40. In the embodiment depicted in FIGS. 1–4, $\beta$ is equal to 90 degrees. Preferably, each cube corner element 40 in the array includes a first tetragonal optical face 42 (FIG. 3) disposed substantially perpendicular to base surface 12, a second tetragonal optical face 44 (FIG. 3) also disposed substantially perpendicular to base surface 12 and perpendicular to first tetragonal face 42, and a third tetragonal optical face 46 disposed parallel to base surface 12 and substantially perpendicular to first optical face 42 and second optical face 44. Additionally, each cube corner element 40 in the array also includes a first tetragonal non-optical surface 50 and a second tetragonal non-optical surface 52.

As used herein, the term "cube corner element" shall be construed consistent with its ordinary meaning in the retroreflective arts. A cube corner element is defined by three substantially mutually perpendicular optical faces that intersect at a single point to define a cube corner. The point of mutual intersection is the peak, or apex, of the cube corner element. The optical axis of the cube corner element is the axis that extends through the cube corner apex and forms an equal angle with the three optical surfaces of the cube corner element.

Figure 4:
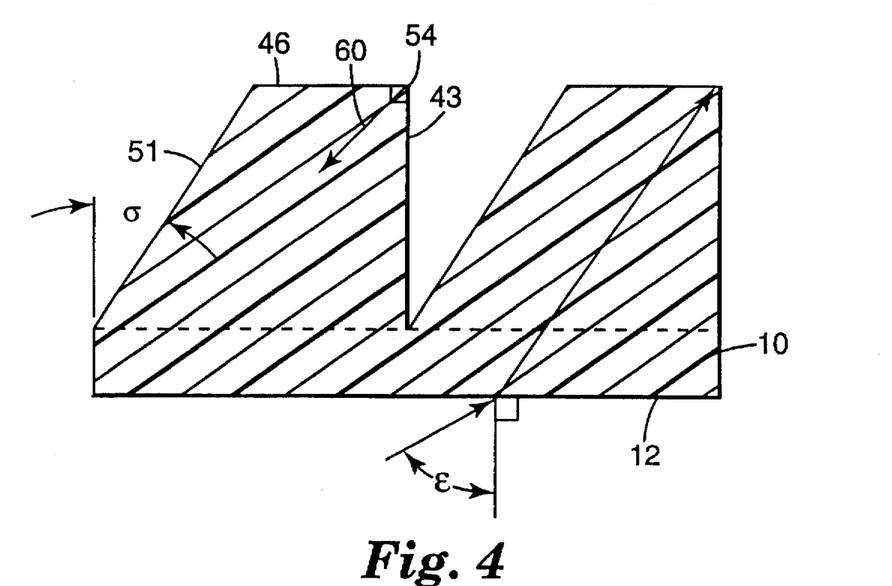
FIG. 4 is a section view, taken through plane 4—4, of the cube corner article depicted in FIG. 1.

In the embodiment depicted in FIGS. 1–4, optical surfaces 42 and 44 are disposed in planes that extend substantially perpendicular to base surface 12 of body portion 10 and third optical surface 46 is disposed in a plane that extends substantially parallel to base surface 12 of body portion 10. Referring to FIG. 4, optical surfaces 42, 44 of each cube corner element 40 intersect along an edge 43 and optical surfaces 42, 44, 46 mutually intersect to define a cube corner apex 54. The symmetry axis 60 of each cube corner element 40 is disposed at an angle of approximately 35.26° relative to base surface 12 of body portion 10. Additionally, in each cube corner element 40, the plane that includes a normal vector to base surface 12 and the symmetry axis 60 intersects groove base 21 and groove base 38 at 45° angles.

In the embodiment depicted in FIGS. 1–4, each cube corner element 40 also includes a first non-optical surface 50 and a second non-optical surface 52. First non-optical surface 50 forms an oblique relief angle $\phi_1$ with a normal vector to base surface 12 of body portion 10 (FIG. 2). In the embodiment depicted in FIGS. 1–4 the angle $\phi_1$ measures approximately 25.36 degrees. Additionally, second non-optical surface 52 forms an oblique relief angle $\phi_2$ with an axis perpendicular to base surface 12 of body portion 10 (FIG. 3). In the embodiment depicted in FIGS. 1–4, the angle $\phi_2$ also measures approximately 25.36 degrees. Non-optical surfaces 50, 52 intersect along an edge 51 that forms angle $\sigma$ with a normal vector to base surface 12 of body portion 10 (FIG. 4). In the embodiment depicted in FIGS. 1–4, the angle $\sigma$ measures approximately 35.26 degrees.

As used herein, the term "relief angle" shall refer to the angle between the plane in which a surface of a cube corner element 40 is disposed and a normal vector to base surface 12 of body portion 10. Surfaces disposed in a plane perpendicular to base surface 12, such as the optical surfaces 42, 44 depicted in FIGS. 1–4, form a relief angle of 0 degrees. By contrast, non-optical surfaces 50, 52 form a relief angles, $\phi_1$ and $\phi_2$, respectively, that each measure approximately 25.36 degrees. While it is preferred that relief angles, $\phi_1$ and $\phi_2$, are substantially the same, one of ordinary skill in the art will recognize that these angles may differ. Although the value of relief angles $\phi_1$ and $\phi_2$ are not critical to the present invention, manufacturing considerations and principles of geometric optics may be employed to establish preferred ranges for these relief angles.

Surfaces that extend perpendicular to base surface 12 of body portion 10 can be detrimental to the process of manufacturing retroreflective articles. In particular, surfaces perpendicular to base surface 12 concentrate stress during the molding process. The stress may physically deform the cube corner elements, thereby causing a corresponding distortion in the optical performance of the retroreflective article. From a manufacturing perspective, it is desirable to form surfaces 50, 52 with non-zero relief angles $\phi_1$ and $\phi_2$, respectively, to inhibit stress concentration during the process of manufacturing retroreflective articles.

However, optics considerations place an upper limit on a preferred range for relief angles $\phi_1$ and $\phi_2$. In particular, edge 51 is preferably disposed at an angle $\sigma$ such that a light ray incident on base surface 12 at a predetermined entrance angle $\epsilon$ in a plane substantially parallel with edge 51 is refracted at the surface of body portion 10 and propagates through the cube corner element at an angle greater than or equal to the angle $\sigma$. The entrance angle $\epsilon$ corresponds to the entrance angle at which the retroreflective article is designed to exhibit its peak performance. Employing principles of geometric optics, the angle $\sigma$ may be derived using the equation:

$$\sigma = \sin^{-1}(\sin(\epsilon)/n)$$

where n is the refractive index of the cube corner element material and $\epsilon$ is the incidence angle (e.g. the entrance angle) of light incident on the base surface 12 of the sheeting. Preferred relief angles $\phi_1$ and $\phi_2$ may be calculated to yield an edge 51 disposed at angle $\sigma$ using the equation:

$$\phi_1 = \phi_2 - \cos^{-1}\sqrt{\frac{\cos\sigma}{\sin\beta}} \ .$$

By way of example, assuming retroreflective sheeting 8 is formed from a material having an index of refraction of 1.5 and is designed for a limiting light ray incident on base surface 12 at an incidence angle $\epsilon$ of 60 degrees, angle $\sigma = 35.26°$ and angles $\phi_1$ and $\phi_2 = 25.36°$. One of ordinary skill in the retroreflective arts will recognize that the preferred values of angles $\phi_1$ and $\phi_2$ are a function of the incidence angle for which the sheeting is designed and the refractive index of the material(s) from which sheeting 8 is formed. In general, a preferred range for relief angles $\phi_1$ and $\phi_2$ are between 5° and 45°. A more preferred range is between 20° and 30°. Additionally, one of ordinary skill in the art will recognize that, in a less preferred embodiment, angles $\phi_1$ and $\phi_2$ need not be identical.

The terms 'active area' and 'effective aperture' are used in the cube corner arts to characterize the percentage of a cube corner element that retroreflects light incident on the base of the element. A detailed teaching regarding the determination of the active aperture for a cube corner element design is beyond the scope of the present disclosure. One procedure for determining the effective aperture of a cube corner geometry is presented in Eckhardt, Applied Optics, v. 10, n. 7, Jul., 1971, pp. 1559–1566. U.S. Pat. No. 835,648 (Straubel) also discusses the concept of effective aperture. In brief, the active area of a cube corner element is a function of the cube corner element geometry, the refractive index of the material, the incidence angle at which light strikes the base surface of the cube corner element, and the orientation of the cube corner element. At a given incidence angle, the active area may determined by the topological intersection of the projection of the three cube corner faces onto a plane normal to the refracted incident light with the projection of the image surfaces of the third reflection onto the same plane. The term 'percent active area' may then be defined as the active area divided by the total area of the projection of the cube corner faces. A cube corner element in accordance with the above description and made from a material having an index of refraction of 1.5 exhibits a maximum percent active area, and thus a theoretical optical efficiency that approaches 100% in response to light incident on the sheeting at an incidence angle $\epsilon$ of 60° when the height of the cube corner element $H_0$ is approximately equal to the spacing $D_0$ between adjacent grooves in the groove sets. The ratio of height Ho to spacing $D_0$ has been characterized in the cube corner arts as the aspect ratio of a cube corner element. Thus, in this example optical performance is maximized when aspect ratio ($H_0$: $D_0$) equals 1.0. However, in practice the aspect ratio may vary from about 0.7 to about 1.2 without suffering functionally significant losses in optical performance.

Figure 5:
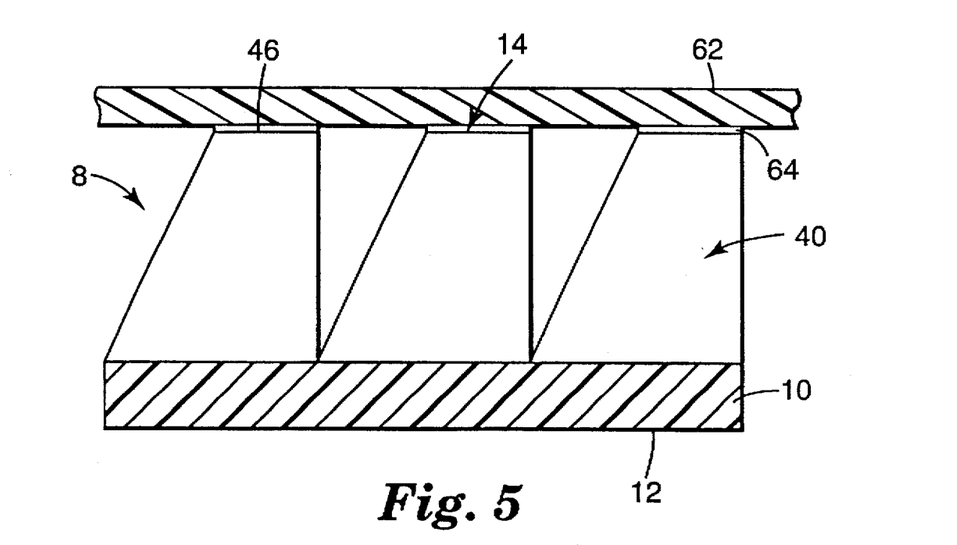
FIG. 5 is a section view of an alternate embodiment of the structured surface of one embodiment of a cube corner article in accordance with the present invention.

FIG. 5 illustrates a retroreflective sheeting 8 in accordance with aspects of the present invention that comprises a backing film 62 disposed adjacent cube corner elements 40. Backing film 62 may be sealed to sheeting 8 by a number of conventional methods including ultrasonic welding, adhesives, or heat sealing backing film 62 onto the sheeting 8. In addition to, or in lieu of, sealing backing film 62 onto the sheeting, backing film 62 may be affixed to third optical surface 46 of at least some of cube corner elements 40 in retroreflective sheeting 8. Backing film 62 preferably provides a substantially hermetically sealed composite retroreflective sheeting material and thereby inhibits contamination of the air interface adjacent optical surfaces 42, 44 of cube corner elements 40. This is particularly important when cube corner elements 40 reflect light according to the principles of Snell's law (e.g. total internal reflection).

One of ordinary skill in the optical arts will recognize that placing backing film 62 in close physical contact with optical surface 46 of cube corner element 40 destroys the air interface necessary for total internal reflection to occur at optical surface 46. Accordingly, optical surface 46 of one or more cube corner elements 40 may be coated with a specularly reflective substance 64 to prevent light from transmitting across the interface between optical surface 46 and sealing film 62. Reflective substance 64 may comprise any reflective material commonly used in the optical arts. Typical examples include specularly reflective metallic coatings including silver, aluminum, and nickel, however, other coatings such as multilayer coatings or dielectric coatings may be useful. Specularly reflective substances may be applied to retroreflective sheeting using techniques well known in the retroreflective arts (e.g. vapor deposition techniques or sputter coating techniques.) Alternatively, optical surface 46 may be covered with a material having a relatively lower index of refraction than the cube corner material such that the optical surface 46 continues to reflect light according to the principles of total internal reflection. One of ordinary skill in the optical arts will also recognize that the entire structured surface 14 of retroreflective sheeting 8 could be coated with a reflective material, or that the reflective material could be disposed on the surface of backing film 62.

Figure 6:
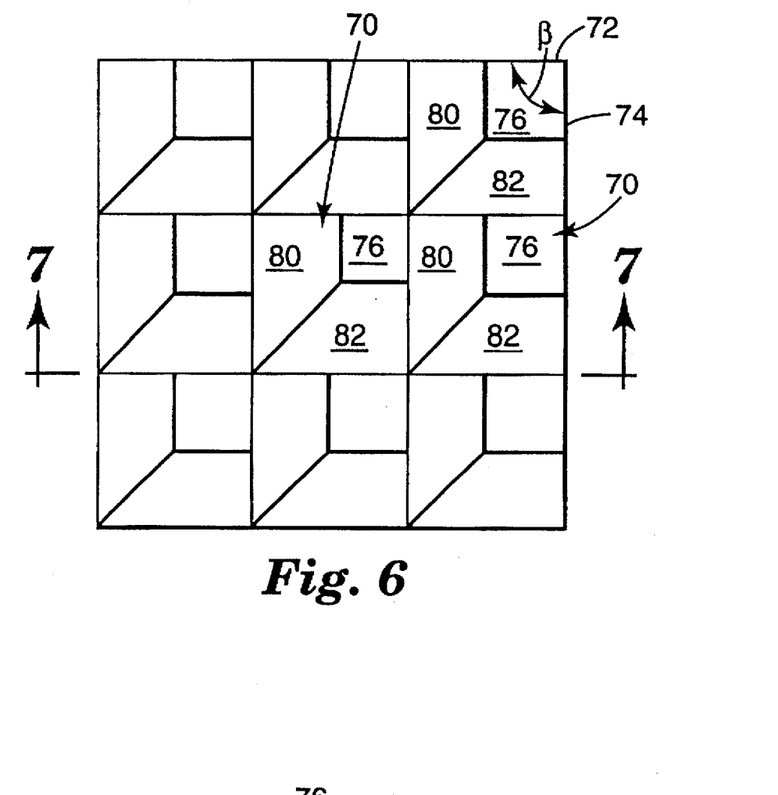
FIG. 6 is a plan of an alternate embodiment of a cube corner article in accordance with the present invention.
Figure 7:
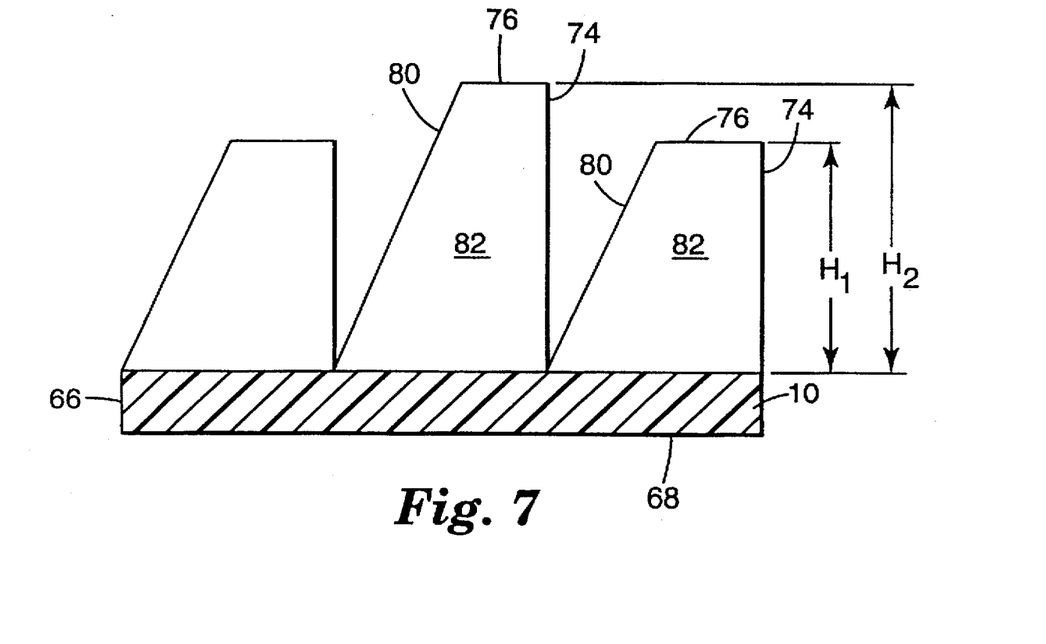
FIG. 7 is a section view, taken through plane 7—7, of the cube corner article depicted in FIG. 6.

FIGS. 6–7 illustrate an alternate embodiment of a retroreflective sheeting in accordance with principles of the present invention. The retroreflective sheeting depicted in FIGS. 6–7 comprises a plurality of cube corner elements 70 having a first tetragonal optical face 72, a second tetragonal optical face 74 disposed substantially perpendicular to first tetragonal face 72, and a third tetragonal optical face 76 disposed substantially perpendicular to first optical face 72 and second optical face 74. Additionally, each cube corner element 70 in the array also includes a first tetragonal non-optical surface 80 and a second tetragonal non-optical surface 82. Third optical surface 76 of at least one cube corner element 70 is disposed at a first height $H_1$ above base surface 68 of body portion 66 and third optical surface 76 of another cube corner element 70 is disposed at a second height $H_2$, different from $H_1$, above base surface 68.

One advantage associated with a structured surface having cube corner elements disposed at two different heights above a common reference plane is that the 'taller' cube corner elements can support a backing layer (e.g. backing layer 62). Thus, the backing layer preferably is optically coupled with only the 'taller' cube corner elements. This preserves the air interface necessary for the remaining cube corner elements to retroreflect light according to Snell's law. Additionally, because the backing layer is supported by the 'taller' cube corner elements, the remaining cube corner elements are not subjected to physical stresses that may distort their optical performance.

Figure 8:
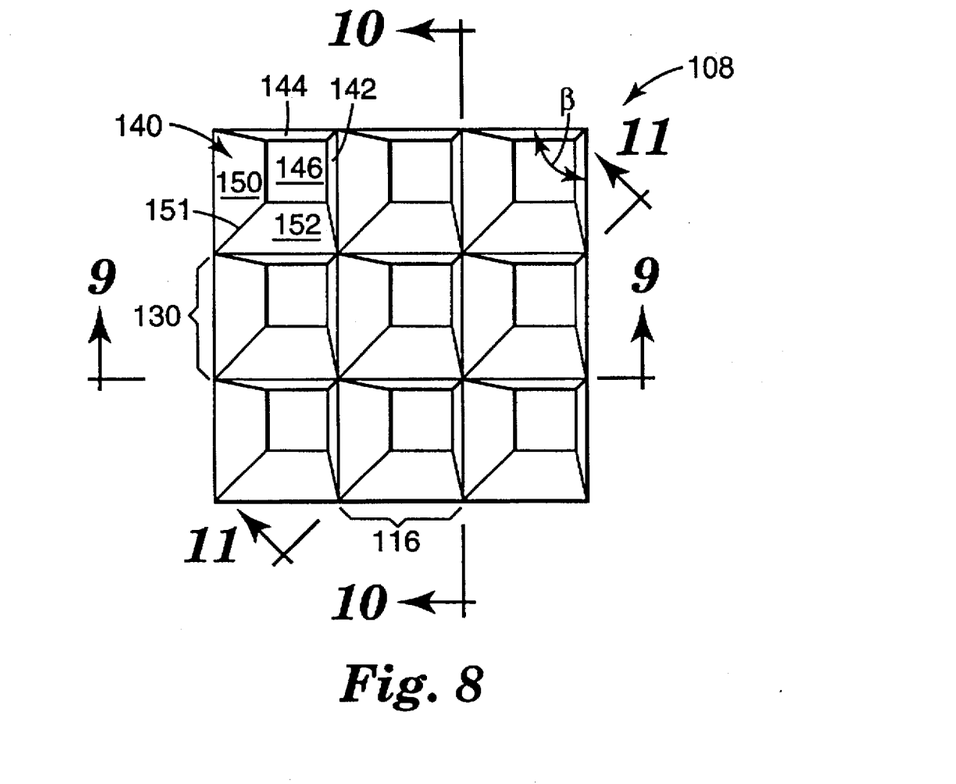
FIG. 8 is a plan view of an alternate embodiment of the structured surface of one embodiment of a cube corner article in accordance with the present invention.
Figure 9:
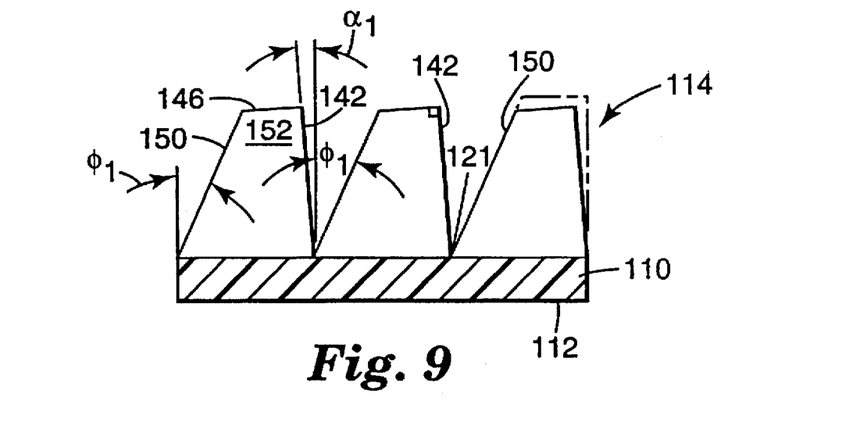
FIG. 9 is a section view, taken through plane 9—9, of the cube corner article depicted in FIG. 8.
Figure 10:
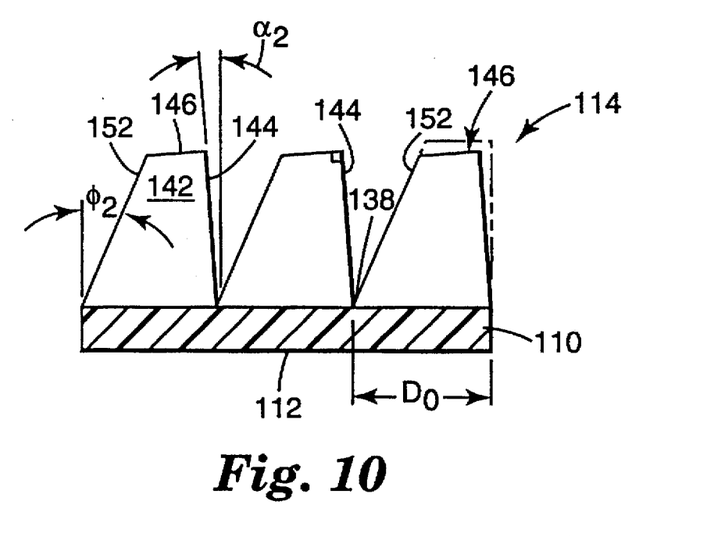
FIG. 10 is a section view, taken through plane 10—10, of the cube corner article depicted in FIG. 8.

FIGS. 8–10 illustrate yet another embodiment of retroreflective sheeting in accordance with principles of the present invention. The retroreflective sheeting 108 depicted in FIGS. 8–10 is substantially similar to the sheeting depicted in FIGS. 1–4, except that each face of each cube corner element 140 is provided with a non-zero relief angle (e.g. is displaced from a plane perpendicular to base surface 112) to eliminate 'vertical' surfaces (e.g. surfaces perpendicular to base surface 112 of sheeting 108) on retroreflective sheeting, thereby improving the manufacturability of the retroreflective sheeting 108.

Referring to FIGS. 8–10 it can be seen that retroreflective sheeting 108 comprises a body portion 110 having a base surface 112 and a structured surface 114 opposite base surface 112. Structured surface 112 includes a first groove set 116 and a second groove set 130 that intersect to define a plurality of cube corner elements 140. First groove set 116 includes at least two, and preferably a plurality of parallel grooves. Referring to FIG. 9, it can be seen that each groove in first groove set 116 defines a plurality of optical surfaces 142 and a plurality of non-optical surfaces 150 that intersect at a groove base 121. First optical surfaces 142 are disposed at a relief angle $\alpha_2$ from a normal vector to base surface 112 of sheeting 108. First non-optical surfaces 150 are disposed at a relief angle $\phi_1$ degrees from a normal vector to base surface 112 of sheeting 108. Second groove set 130 also includes at least two, and preferably a plurality of parallel grooves. Referring to FIG. 10, it can be seen that each groove in second groove set 130 defines a plurality of optical surfaces 144 and a plurality of non-optical surfaces 152 that intersect at a groove base 138. Second optical surfaces 144 are also disposed at a relief angle $\alpha_2$ from a normal vector to base surface 112 of sheeting 108. Second non-optical surface 136 is disposed at a relief angle $\phi_2$ from an axis perpendicular to base surface 112 of sheeting 108.

A plurality of grooves in first groove set 116 intersect a plurality of grooves in second groove set 130 at an intersection angle β (FIG. 8) to define an array of cube corner elements 140. The angle β is a function of the relief angles $\alpha_1$ and $\alpha_2$ provided to the optical surfaces of the cube corner elements and must be calculated to ensure that optical surfaces 142 and 144 are substantially perpendicular. In an embodiment where $\alpha_1 = \alpha_2$, β may be calculated from the formula:

$$\beta = \cos^{-1}(\tan^2\alpha)$$

Note that for the embodiment depicted in FIGS. 1–4, relief angle $\alpha_1 = \alpha_2 = 0$ degrees and intersection angle β=90 degrees. Preferably, relief angles $\alpha_1$, $\alpha_2$ measure between 0° and 20°, and more preferably between 3° and 10°. Accordingly, a preferred range for intersection angle β extends from 90° to 82°.

In the embodiment depicted in FIGS. 8–11, the optical surfaces of each groove are provided with a relief angle of 6°. Accordingly, the groove sets intersect at an intersection angle β of approximately 89.367° to define an array of cube corner elements 140. Preferably, each cube corner element 140 in the array includes a first tetragonal optical face 142 disposed at a 6.00° relief angle from a plane perpendicular to base surface 112, a second tetragonal optical face 144 also disposed at a 6.00° relief angle from a plane substantially perpendicular to base surface 112 and to first tetragonal face 142, and a third tetragonal optical face 146 disposed at a 8.50° relief angle from a plane parallel to base surface 112. Third optical face 146 is substantially perpendicular to first optical face 142 and second optical face 144. Additionally, each cube corner element 140 in the array also includes a first tetragonal non-optical face 150 and a second tetragonal non-optical face 152 that intersect along an edge 151.

Figure 11:
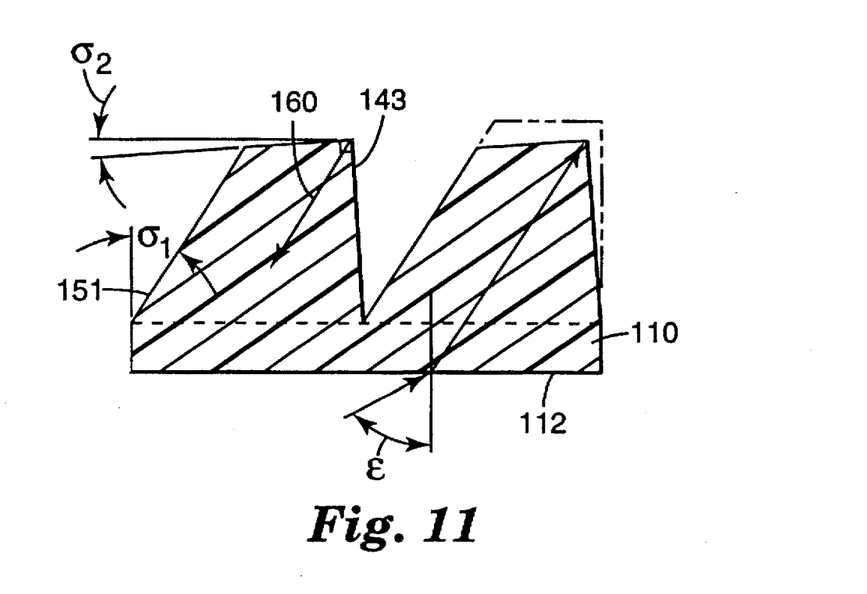
FIG. 11 is a section view, taken through plane 11—11, of the cube corner article depicted in FIG. 8.

Referring to FIG. 11 optical faces 142, 144 intersect along edge 143 to form an orthogonal dihedral angle between faces 142, 144. Edge 143 is disposed at an angle of approximately 8.50° from a normal vector to base surface 112 of body portion 110. The symmetry axis 160 of cube corner element 140 is disposed at an angle of approximately 43.76° with the base surface 112 of body portion 110. One of ordinary skill in the retroreflective arts will recognize that cube corner elements 140 could be formed with greater or lesser relief angles, resulting in greater or lesser degrees of tilt in the symmetry axis 160 of the cube corner elements.

As discussed above, a retroreflective sheeting in accordance with the present invention is particularly well adapted for use in high incidence angle lighting applications such as, for example, pavement marking applications, jersey barricade marking applications, or vehicle conspicuity marking applications. In use, a retroreflective sheeting in accordance with the present invention may be affixed to an object. Preferably, the sheeting is oriented such that, in use, the symmetry axes of the cube corner elements point in the general direction of the light source.

Various features and modifications known in the art may be incorporated into the retroreflective sheeting of the present invention. By way of example, minor variations may be introduced in the included angles of adjacent grooves in a groove set to form cube corner elements that have optical faces that intersect at minor deviations from orthogonality. See, e.g. U.S. Pat. No. 4,775,219 to Appeldorn. Additionally, a plurality of cube corner arrays may be oriented in different directions to provide a tiled retroreflective sheeting. See, e.g. U.S. Pat. No. 3,926,402 (Heenan et al.).

Retroreflective sheeting in accordance with the present invention may be manufactured according to one or more of the following procedures. First, a master mold is manufactured by forming two perpendicular groove sets in a suitable body portion using a precision diamond machining tool. Each groove set comprises a plurality of substantially parallel grooves cut with an asymmetric tool. The optical surface of the groove may extend perpendicular to the base surface of the body portion, as discussed in connection with FIGS. 1–4, or may be disposed at a relief angle. The non-optical surface of the groove is preferably disposed at a relief angle between 20 and 30 degrees. The grooves are preferably cut to a depth that measures between 26 micrometers and 260 micrometers in the body portion and adjacent grooves are also separated by a distance that measures between 26 micrometers and 260 micrometers. The second groove set is formed in a like manner such that the optical surfaces of the first groove set and the second groove set intersect along an edge to form a substantially orthogonal dihedral angle between the two surfaces. If the optical surfaces of the cube corner elements are provided with a relief angle, then a subsequent machining operation may be required to ensure that the third optical face of the cube corner element is mutually perpendicular to the faces formed by the optical surfaces of the first and second groove sets. Completion of these steps forms a master mold having a structured surface that is a positive mold of a cube corner element array. Feasible groove spacings and corresponding cube corner element densities are presented in Table I.

TABLE I

| Groove Spacing ($D_o$) (μ) | Cube Corner Element Density $\left(\dfrac{\text{elements}}{\text{cm}^2}\right)$ |
| --- | --- |
| 700 | 200 |
| 260 | 1500 |
| 26 | 150000 |
| 10 | 1000000 |

After the master mold is formed, it can be replicated to form negative molds of the cube corner array. Negative molds of the master mold can be made by electroforming the master mold or other techniques known to one of ordinary skill in the arts.

A transparent plastic film or sheet may then be pressed against a positive mold or die to form or emboss in the film or sheet the pattern of the positive mold. Alternatively, a liquid film forming material could be cast onto a negative mold. By controlling the depth of the impression on the plastic film or sheet, the base portion of the film or sheet that does not receive the mold impression functions as the body portion form supporting the cube corner elements. This process forms an integral, (e.g. unitary) retroreflective sheeting product. Suitable materials for forming an integral retroreflective sheeting in accordance with the present invention include materials which are dimensionally stable, durable weatherable and readily formable into the desired configuration. Examples of suitable materials include acrylics, which generally have an index of refraction of about 1.5, such as Plexiglas resin from Rohm and Hass; polycarbonates, which have an index of refraction of about 1.6; reactive materials such as those taught in United Kingdom Pat. No. 2,027,441, polyethylene-based ionomers (marketed under the name of "SURLYN"), polyesters, and cellulose acetate butyrates. The sheeting may also include UV absorbers or other additives as needed.

In an alternate embodiment, the sheeting may be manufactured as a composite material comprising an overlay film formed from a first material and an array of cube corner elements secured to the overlay film and formed from a second material having different physical, chemical or optical properties than the first material. In one embodiment, the overlay film may be formed from a flexible or elastomeric polymer having a relatively low elastic modulus material (e.g. less than $7 \times 10^8$ pascals) while the cube corner elements may be formed from a relatively rigid polymer having a high elastic modulus (e.g. greater than $10 \times 10^8$ pascals) to yield a flexible cube corner retroreflective sheeting. Examples of suitable materials and manufacturing processes for forming a composite sheeting are set forth in detail in U.S. Pat. No. 5,450,235 and in U.S. Ser. No. 08/472,444 which are incorporated herein by reference.

The reflecting elements and body portion may be provided with a backing layer of material to strengthen the sheeting and/or to protect the reflective elements from contamination by dirt and moisture. Typically, the backing layer comprises an opaque thermoplastic film or sheet, preferably one having good weathering properties. Suitable backing materials include aluminum sheeting, galvanized steel, polymeric materials such as polymethyl methacrylates, polyesters polyamides, polyvinyl fluorides, polycarbonates, polyvinyl chlorides, and a wide variety of laminates made from these and other materials.

The backing film or sheet may be adhered to the top surface of one or more cube corner elements, as discussed above in connection with FIG. 5. The backing film or sheet may also be sealed in any suitable configuration. Sealing may be affected by use of a number of methods, including ultrasonic welding, adhesives, or by heat sealing at discrete locations on the array of reflecting elements. See, e.g. U.S. Pat. No. 3,924,929. Sealing the backing film inhibits dirt and moisture from contaminating the air spaces adjacent the reflective faces of the cube corner elements. If the retroreflective sheeting reflects light according to the principles of total internal reflection, then it is particularly important to maintain a clean air interface adjacent the reflective faces of the cube corner elements. If the air interface between the optical faces of the cube corner elements is contaminated by dirt or water, then the optical efficiency of the retroreflective sheeting will be reduced.

If desired, the retroreflecting elements may be coated with a specularly reflective material (e.g. silver, aluminum) so that the reflecting surfaces of the cube corner elements retroreflect light according to the principles of specular reflection, rather than according to the principles of total internal reflection. In this embodiment, it is unnecessary to maintain a clean air interface because light reflects from the metallized surfaces of the cube corner elements. Nevertheless, it may be desirable to provide a backing layer to metallized retroreflective sheeting for use as an adhesive surface.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any body portion without the added step of applying an adhesive or using other fastening means.

As discussed above, a retroreflective sheeting in accordance with the present invention is particularly well adapted for use in high incidence angle lighting applications such as, for example, pavement marking applications, jersey barricade marking applications, or vehicle conspicuity marking applications. In use, a retroreflective sheeting in accordance with the present invention may be affixed to an object. Preferably, the sheeting is oriented such that the symmetry axes of the cube corner elements extend in the direction of the light source. It will be appreciated that the retroreflective sheeting could be tiled to accommodate light entering from two or more different directions. Light from the light source becomes incident on the base surface of the retroreflective sheeting, is refracted through the body portion, reflected from the three mutually perpendicular faces of the cube corner elements, and redirected toward the light source.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A retroreflective cube corner article comprising a body portion having a base surface disposed in a base plane and a structured surface opposite the base surface, the structured surface including an array of cube corner elements, at least one of the cube corner elements comprising:

a first tetragonal optical face;

a second tetragonal optical face intersecting the first tetragonal optical face at an orthogonal dihedral angle;

a third tetragonal optical face intersecting the first tetragonal optical face at an orthogonal dihedral angle and intersecting the second tetragonal optical face at an orthogonal dihedral angle to define a cube corner apex;

a first tetragonal nonoptical face disposed at a non-zero relief angle relative to a normal vector to the base plane; and a second tetragonal non-optical face disposed at a non-zero relief angle relative to a normal vector to the base plane.

2. A retroreflective cube corner article according to claim 1, wherein:

the third tetragonal optical face is disposed substantially parallel to the base plane.

3. A retroreflective cube corner article according to claim 1, wherein:

the third tetragonal optical face is disposed at an oblique angle relative to the base plane.

4. A retroreflective cube corner article according to claim 3, wherein:

the oblique angle measures less than about 30 degrees.

5. A retroreflective cube corner article according to claim 3, wherein:

the oblique angle measures less than about 20 degrees.

6. A retroreflective cube corner article according to claim 3, wherein:

the first tetragonal optical face is disposed at a relief angle relative measuring between 0 and 20 degrees from a normal vector to the base plane.

7. A retroreflective cube corner article according to claim 3, wherein:

the second tetragonal optical face is disposed at a relief angle relative measuring between 0 and 20 degrees from a normal vector to the base plane.

8. A retroreflective cube corner article according to claim 1, wherein:

the first tetragonal non-optical face is disposed at a relief angle measuring between 5 degrees and 45 degrees relative to a normal vector to the base plane.

9. A retroreflective cube corner article according to claim 1, wherein:

the first tetragonal non-optical face is disposed at a relief angle measuring between 20 degrees and 30 degrees relative to a normal vector to the base plane.

10. A retroreflective cube corner article according to claim 1, wherein:

the second tetragonal non-optical face is disposed at a relief angle measuring between 5 degrees and 45 degrees relative to a normal vector to the base plane.

11. A retroreflective cube corner article according to claim 1, wherein:

the second tetragonal non-optical face is disposed at a relief angle measuring between 20 degrees and 30 degrees relative to a normal vector to the base plane.

12. A retroreflective sheeting comprising a body portion having a base surface disposed in a base plane and a structured surface opposite the base surface, the structured surface including an array of cube corner elements, substantially every cube corner element in the array comprising:

a first tetragonal optical face;

a second tetragonal optical face intersecting the first tetragonal optical face at an orthogonal dihedral angle;

a third tetragonal optical face intersecting the first tetragonal optical face at an orthogonal dihedral angle and intersecting the second tetragonal optical face at an orthogonal dihedral angle to define a cube corner apex;

a first tetragonal non-optical face disposed at a relief angle relative to a normal vector to the base plane; and a second tetragonal non-optical face disposed at a relief angle relative to a normal vector to the base plane.

13. A retroreflective sheeting in accordance with claim 12, wherein:

a portion of the structured surface is coated with a reflective material.

14. A retroreflective sheeting in accordance with claim 12, wherein:

the third tetragonal optical face of each cube corner element is disposed at substantially the same height above the base surface.

15. A retroreflective sheeting in accordance with claim 12, wherein:

the apexes of a plurality of cube corner elements is disposed at a first height above the base surface; and the apex of at least one cube corner element is disposed at a second height above the base surface, different from the first height.

16. A retroreflective sheeting in accordance with claim 12, further comprising:

a backing film disposed adjacent the structured surface.

17. A retroreflective sheeting in accordance with claim 16, wherein:

the backing film comprises a reflective material.

18. A retroreflective sheeting in accordance with claim 12, wherein:

the structured surface comprises between 200 and 1,000,000 cube corner elements per square centimeter.

19. A retroreflective sheeting in accordance with claim 12, wherein:

the structured surface comprises between 1500 and 150,000 cube corner elements per square centimeter.

20. A retroreflective sheeting in accordance with claim 12, wherein:

the body portion is formed from a first polymeric material having an elastic modulus less than $7 \times 10^8$ pascals; and the cube corner elements are formed from a second polymeric material having an elastic modulus greater than $16 \times 10^8$ pascals.

* * * * *